May 23, 1944.    N. R. BIERLY    2,349,697
ART OF PRODUCING SELENIUM
Filed Jan. 4, 1941
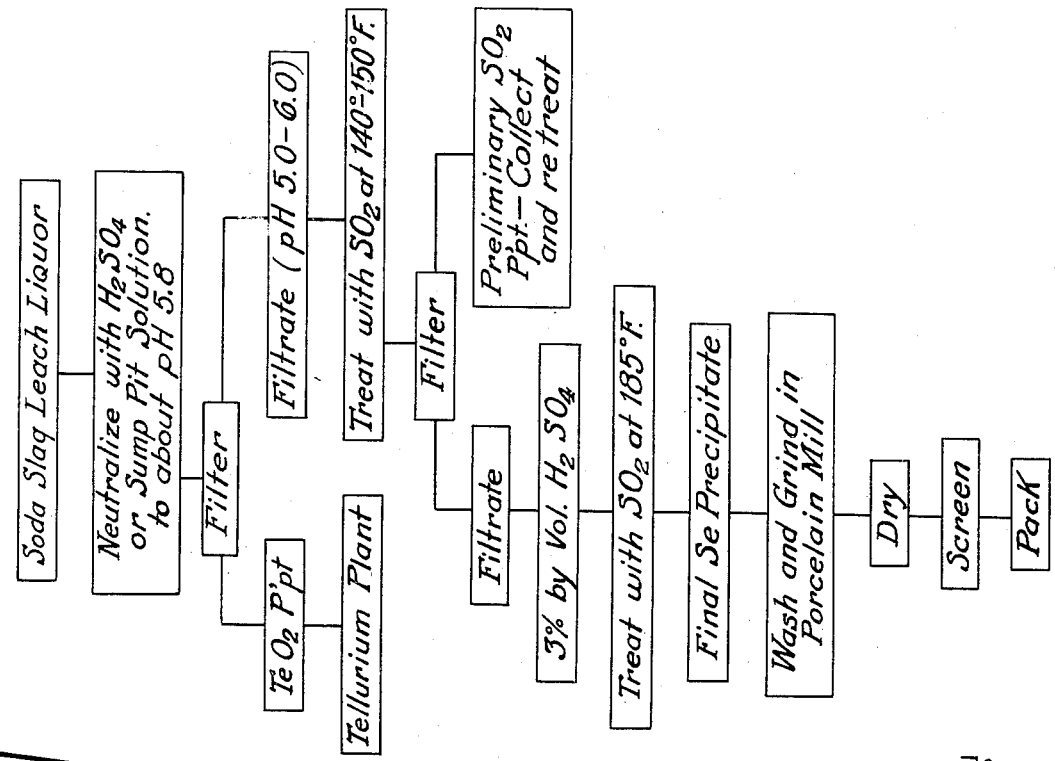
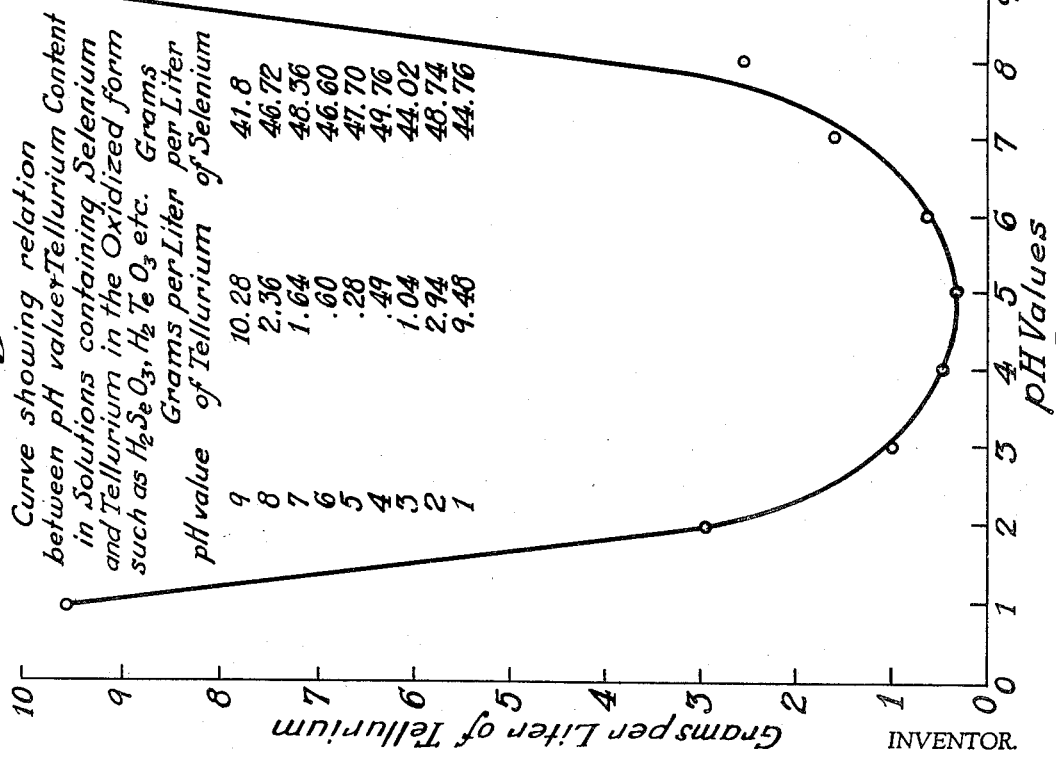

Patented May 23, 1944

2,349,697

UNITED STATES PATENT OFFICE 2,349,697

ART OF PRODUCING SELENIUM

Nevin Richard Bierly, Avenel, N. J., assignor to The American Metal Company, Limited, New York, N. Y., a corporation of New York Application January 4, 1941, Serial No. 373,147

4 Claims. (Cl. 23—209)

My invention relates to an improved method of producing selenium.

In accordance with my invention, selenium, in a substantially pure form, is obtained by eliminating impurities, particularly tellurium, from a selenium-containing solution.

Various other features and advantages of my invention will become apparent from the following detailed description.

My invention resides in the novel method of producing selenium as hereinafter particularly described and claimed.

On the accompanying drawing:

Figure 1 is a curve showing the relation which exists between pH values and the tellurium content of a solution containing selenium and tellurium; and Fig. 2 is a flow sheet illustrating the invention.

Much of the selenium produced today is obtained from the small quantities which are present in blister copper. This blister copper is subjected to electrolysis for the production of pure electrolytic copper and in this operation a slime is produced containing silver and gold, primarily, and also many impurities among which are selenium and tellurium. The aforesaid slime is melted down for the purpose of making doré silver and during this operation much of the selenium is removed with a soda slag, while the balance volatilizes and enters the flue system.

The soda slag is water-leached resulting in an alkaline solution containing selenium and some tellurium.

The selenium entering the flue system is collected primarily in the solutions from the scrubber in the flue system and the solutions from the Cottrell electric precipitator at the end of the flue system. This combined liquor from the scrubber and Cottrell precipitator is commonly called "sump-pit" solution and is an impure acid solution containing selenium and tellurium.

In ordinary commercial practice, the aforesaid basic and acid solutions may be combined to produce a neutral solution, or it may be necessary to add an acid or basic material to obtain a neutral solution. In any event, a neutral solution is made with a pH of about 7, which causes most of the tellurium to precipitate out as oxide. This tellurium sludge is carefully filtered off and the clear filtrate is transferred to the selenium precipitation tanks. The filtrate is kept on the acid side by adding acid and then sulfur dioxide bubbled through to precipitate the selenium. It is in this operation that the small amounts of tellurium still in solution are precipitated with the selenium and cause this impurity to appear in appreciable quantities in the final product. The precipitated selenium is then passed through the regular processing steps and placed on the market. The impurity which is found in the greatest percentages in selenium is usually tellurium and, in the ordinary grades of selenium on the market today, the tellurium may range anywhere from about 0.10% in the best grades to over 1.0% in the lower grades. Thus, with a pH of around 7 representing a neutral solution at which tellurium precipitation usually occurs in accordance with present practice, I have found that there are considerable irregularities in the tellurium content of solutions and have noticed that the tellurium precipitation is not complete. As hereinafter pointed out, I have discovered that the tellurium content reaches its lowest point between pH 4 and pH 6.

In accordance with my invention, I have found, in practice, that the best results are obtained by bringing the solution containing selenium and other impurities within a pH range from approximately 4 to slightly less than 7 and preferably about 5, thereby precipitating the bulk of the tellurium as tellurium oxide ($TeO_2$) together with iron, copper and lead. Upon filtering this solution, the filtrate will be within the range about pH 4 to about pH 6. Thereupon, the second step in the process is taken, namely, the filtrate is heated to about 140 degrees F.–150 degrees F. and sulfur dioxide is bubbled through whereby the balance of the tellurium in the metallic form with other impurities as a white or gray precipitate are precipitated. This action is continued until some red selenium is precipitated whereupon bubbling of the sulfur dioxide is discontinued and the solution allowed to stand several hours or preferably overnight, this being desirable because the tellurium precipitates rather slowly. Due to the reaction between the sulfur dioxide and the metallic oxide constituents tellurium oxide ($TeO_2$), selenium oxide ($SeO_2$), etc., there will be formed in the solution some sulfuric acid which will alter the pH of the solution. At this point, the pH accordingly will ordinarily be about pH 4.5. In operating the process, it has been observed at times that this pH may run at this point as low as 2.5. After standing, as mentioned above, the solution is heated to about 180 degrees F. and filtered in order to convert the red selenium precipitate into the gray form, since the gray form permits more rapid filtering. The gray precipitate is then filtered off and the filtrate is then treated for selenium recovery in accordance with any of the generally accepted processes.

In order to further illustrate my invention, I shall describe the steps taken on a particular run, the steps being indicated in a graphic manner on the flow sheet, Fig. 2. In melting furnaces in which are treated materials containing selenium and tellurium, such as slimes from an electrolytic copper refinery which contain, for example, 10% selenium and 3% tellurium, there is produced a soda slag containing about 35% selenium and 5% tellurium. A batch of this soda slag was leached with water and the leach liquor, being basic, was neutralized with sulfuric acid to a pH of 5.8. The tellurium hydroxide precipitated was filtered and the filter cake set aside for tellurium recovery. The clear filtrate was heated to 145 degrees F. and sulfur dioxide introduced until red selenium began to appear. The solution with the precipitate was allowed to stand overnight. The next morning the solution was heated to 185 degrees F. for a short time in order to convert the red selenium to the gray form which improves the speed of the filtering operation which follows. After filtering, the solution was transferred to the regular precipitators where sulfuric acid was added if necessary and the solution again brought to 185 degrees F. in temperature. It has been found in practice that the pH of the solution at this time should be about 3. This pH may occur without addition of any acid due to the formation in the solution of sulfuric acid through the interaction of the tellurium and sulfur dioxide but as stated, if it is necessary, sulfuric acid may be added to bring the pH to about 3. In some practice, it has been fond that it is necessary to add up to about 3% by volume of sulfuric acid to obtain the desired pH. The pure selenium was then precipitated with sulfur dioxide in accordance with U. S. Patent No. 1,730,681 issued to Ogden and Valentine.

Some of the selenium produced was ground in a porcelain pebble mill and gave the following analysis.

| | |
|---|---|
| Selenium | 99.95 } Chemical |
| Tellurium | Less than .02% |
| Copper | .005 |
| Iron | .005 |
| Lead | .01 } Spectrographic |
| Tin | .002 |
| Silicion | .04 |

The silicon is a little high due to the use of a pebble mill as described above. This follows because a small sample ground with a mortar and pestle showed only .01% silicon.

Thus, with the present invention, the solution used in the final precipitation is first so purified that there is practically no tellurium present when the selenium is precipitated. By my invention, the tellurium content of selenium may be maintained below .02% and in some instances has been brought down to traces.

On Fig. 1 of the drawing, there is illustrated a typical curve showing the tellurium content of selenium liquors having various pH values, the data for this curve having been obtained from the results of a series of tests. The solutions used had a selenium content of about 45 grams per liter. As will be seen from the curve, the lowest tellurium content, namely, around 0.5 gram per liter, is reached between pH 4 and pH 6, while at pH 7 to which point selenium liquors are at present neutralized, the tellurium content is higher, i. e., around 1.5 grams per liter.

The selenium product by my improved process may be still further refined by a number of methods, but the method which I have found to be particularly desirable is that of distillation from a vitreosil retort.

The distilled selenium when made in a neutral atmosphere is a super-refined product as shown by the following assay:

| | |
|---|---|
| Copper | per cent__ 0.0015 |
| Iron | do____ 0.0015 |
| Lead | Not detected |
| Zinc | Not detected |
| Tin | Not detected |
| Tellurium | Trace |
| Magnesium | Trace |

As described above, there are two solutions resulting from the electrolysis of blister copper from which selenium and tellurium may be recovered. One of these is the strongly alkaline soda slag solution and the other is the impure sump-pit acid solution. In accordance with the invention, I have ascertained that the sump-pit solution may be utilized in lieu of the described sulfuric acid in order to obtain a resulting solution having a desired pH.

Besides making available an additional amount of selenium for pure selenium production, this phase of the invention also saves the cost of pure sulfuric acid. It was found that when the soda slag solution is neutralized with the sump-pit solution to a pH of 4 to 6 and then treated in exactly the same manner as when it is neutralized with pure sulfuric acid, the same purity of selenium cannot be obtained. The tellurium cannot be brought to the same low content as when using pure sulfuric acid. This can be explained by the origin and condition of the two solutions. The selenium and tellurium in the soda-slag-leach liquor is there almost totally in the four-valent forms of each metal in which condition the small quantities of tellurium remaining after neutralization can be completely eliminated by my short preliminary sulfur dioxide treatment in accordance with my invention. On the other hand, the sump-pit solution contains considerable quantities of six-valent selenium and tellurium, which is not completely reduced to the elemental state by the short preliminary sulfur dioxide treatment mentioned. These higher valent compounds are predominant in the sump-pit solution because of the oxidizing and varying temperature conditions in the flue system of the silver refinery. With this in mind, tests were conducted using these two solutions, but employing an extended sulfur dioxide treatment to overcome the inefficient preliminary reduction of tellurium. In this way, a selenium product can be obtained which is comparable to that obtained when the alkaline solution is neutralized with sulfuric acid and given the shorter preliminary sulfur dioxide treatment. In the laboratory tests, the preliminary sulfur dioxide treatment was approximately one-half hour when the soda slag solution was treated with sulfuric acid, and about one and one-half hours when the soda slag solution was neutralized by the sump-pit solution. The final selenium product in each case was comparable in purity. If the soda slag and sump-pit solution is treated for only one-half hour, a final selenium product of variable tellurium content is obtained. There is, however, considerably more selenium lost in the preliminary precipitate because of the more lengthy sulfur dioxide treatment. A recovery of 90% of selenium or better has been obtained when soda slag solutions and sulfuric acid were used with the shorter preliminary sulfur dioxide treatment. On the other hand, only 75% to 80% selenium recoveries result with the use of the sump-pit solutions in place of pure sulfuric acid and the extended sulfur dioxide treatments.

The times given above for the preliminary sulfur dioxide treatment only relate to tests in the laboratory. A definite time limit cannot be given for any particular case. This time depends upon a number of factors, such as, quantity of solution being treated, the degree of dispersion of the sulfur dioxide entering the solution, the efficiency of the equipment, etc. Aside from these mechanical factors, the amount of six-valvent compounds in solution greatly affects the time required for the preliminary sulfur dioxide treatment. This was demonstrated by the fact that the preliminary sulfur dioxide treatment required more than three hours in the large-scale plant test.

From the tests conducted in the laboratory, it is evident that any solution containing selenium and tellurium can be used for the production of a pure selenium product, in accordance with my invention, so long as the contents of the solutions are known. For example, the sump-pit solution may not be acid, but basic. In this case, there would be available a basic solution containing appreciable quantities of higher valent compounds, and, therefore, the basic solution, after neutralization, would require an extended preliminary sulfur dioxide treatment.

It would obviously be necessary to extend the preliminary sulfur dioxide treatment of the soda slag solution in order to obtain the desired purity of the final selenium, if for any reason the selenium and tellurium in the soda slag be oxidized from the four-valent to the six-valent condition before or during the water leach operation.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. The method of producing selenium, which comprises adding acid to precipitate impurities such as tellurium from a solution containing selenium and said impurities until the resulting solution contains a slight excess of acid and has a pH between approximately 4 and less than 7, filtering said resulting solution, and treating the filtrate at an elevated temperature with acid capable of precipitating tellurium and selenium as oxides, precipitating additional tellurium as oxide and stopping the treatment with acid upon appearance of a red selenium precipitate.

2. The method of producing selenium, which comprises adding acid to precipitate impurities such as tellurium from a solution containing selenium and said impurities until the resulting solution contains a slight excess of acid and has a pH between approximately 4 and slightly less than 7, filtering said resulting solution, and treating the filtrate at an elevated temperature with sulfur dioxide to precipitate additional tellurium and stopping the treatment with sulfur dioxide upon appearance of a red selenium precipitate.

3. The method of producing selenium, which comprises adding acid to precipitate impurities such as tellurium from a solution containing selenium and said impurities until the resulting solution contains a slight excess of acid and has a pH between approximately 4 and slightly less than 7, filtering said resulting solution, and bubbling sulphur dioxide through the filtrate at approximately 140 degrees F.–150 degrees F. to precipitate additional tellurium and other impurities therefrom, and stopping the bubbling of said sulfur dioxide through the filtrate upon appearance of a red selenium precipitate.

4. The method of producing selenium, which comprises adding an acid solution containing selenium and tellurium to an alkaline solution containing selenium, tellurium and other impurities to produce a resulting solution containing a slight excess of acid and having a pH between approximately 4 and slightly less than 7 whereby the tellurium and other impurities are precipitated to substantial extent, filtering said resulting solution, and bubbling sulphur dioxide through the filtrate at an elevated temperature to precipitate additional tellurium and other impurities therefrom, and stopping the treatment with said sulfur dioxide upon appearance of a red selenium precipitate.

NEVIN RICHARD BIERLY.